United States Patent
Huynh et al.

(10) Patent No.: US 10,309,852 B2
(45) Date of Patent: Jun. 4, 2019

(54) REDUNDANT MEASUREMENT OF PSEUDO DIFFERENTIAL PRESSURE USING ABSOLUTE PRESSURE SENSORS

(71) Applicant: Rosemount Aerospace Inc., Burnsville, MN (US)

(72) Inventors: Cuong Tho Huynh, Shakopee, MN (US); Charles Little, Belle Plaine, MN (US); Nghia T. Dinh, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 280 days.

(21) Appl. No.: 15/349,501

(22) Filed: Nov. 11, 2016

(65) Prior Publication Data
US 2018/0136067 A1    May 17, 2018

(51) Int. Cl.
*G01L 15/00* (2006.01)
*G01L 9/06* (2006.01)
(Continued)

(52) U.S. Cl.
CPC ............ *G01L 13/06* (2013.01); *G01L 9/0055* (2013.01); *G01L 9/06* (2013.01); *G01L 13/025* (2013.01); *G01L 15/00* (2013.01)

(58) Field of Classification Search
None
See application file for complete search history.

(56) References Cited

U.S. PATENT DOCUMENTS

| 6,029,524 A | 2/2000 | Klauder et al. |
| 6,272,928 B1 * | 8/2001 | Kurtz .................. G01L 9/0055 73/721 |

(Continued)

FOREIGN PATENT DOCUMENTS

DE   102011002884 A1   12/2011

OTHER PUBLICATIONS

Extended European Search Report, for European Patent Application No. 17200695.9, dated Mar. 8, 2018, 6 pages.

*Primary Examiner* — Peter J Macchiarolo
*Assistant Examiner* — Jermaine L Jenkins
(74) *Attorney, Agent, or Firm* — Kinney & Lange, P.A.

(57) ABSTRACT

Apparatus and associated methods relate to generating redundant measurement of pseudo differential pressure using two absolute-pressure sensors, each exposed to a different environment. Each of the two absolute-pressure sensors has complementary first and second output nodes. The first output node has a positive relation with and/or response to increasing pressure, while the second output node has a negative relation with and/or response to increasing pressure. A first difference measurement signal is calculated based on a difference between the positive relation output signals of the first and second absolute-pressure sensors. A second difference measurement signal is calculated based on a difference between the negative relation output signals of the first and second absolute-pressure sensors. Both the first and second difference measurement signals are indicative of a pressure difference between the first and second environments. Such redundant measurement of differential pressure can advantageously provide continuous pressure-difference measurement in spite of various component failures.

19 Claims, 5 Drawing Sheets

(51) Int. Cl.
*G01L 13/06* (2006.01)
*G01L 9/00* (2006.01)
*G01L 13/02* (2006.01)

(56) References Cited

U.S. PATENT DOCUMENTS

| | | | |
|---|---|---|---|
| 6,612,179 B1* | 9/2003 | Kurtz | G01L 9/0052 |
| | | | 73/727 |
| 7,258,018 B2* | 8/2007 | Kurtz | G01L 9/0042 |
| | | | 73/715 |
| 7,866,215 B2* | 1/2011 | Kurtz | G01L 9/0054 |
| | | | 73/721 |
| 8,466,523 B2* | 6/2013 | Chiou | G01L 9/0052 |
| | | | 257/417 |
| 8,910,524 B2 | 12/2014 | Bemis et al. | |
| 9,593,994 B2* | 3/2017 | Nguyen | G01L 13/025 |
| 9,804,048 B2* | 10/2017 | Zhang | G01L 9/0055 |
| 2007/0089526 A1 | 4/2007 | Kurtz et al. | |
| 2015/0311353 A1 | 10/2015 | Van Der Wiel | |

* cited by examiner

REDUNDANT MEASUREMENT OF PSEUDO DIFFERENTIAL PRESSURE USING ABSOLUTE PRESSURE SENSORS

BACKGROUND

Differential pressure sensors are used to measure a difference between pressures of two fluid environments. These two fluid environments may be located nearby one another or at great distance one from another. Differential pressure sensors come in at least two varieties: i) true differential pressure sensors; and ii) pseudo differential pressure sensors. True differential pressure sensors provide fluid communication between each of the two environments and to each of two sides of a differential pressure transducer, respectively.

Pseudo differential pressure sensing can be accomplished using two distinct absolute pressure sensors. Each absolute pressure sensor is exposed to one of the two fluid environments so as to measure that fluid environment's absolute pressure. By taking the difference of resulting signals indicative of absolute pressures of the two fluid environments, a signal indicative of a difference between the two absolute pressures can be generated.

Various types of pressure sensors have various advantages and disadvantages. In some circumstances, for example, it may be undesirable to expose both sides of a differential pressure sensor to high pressures. In such cases, a pseudo differential pressure sensor may be preferable to a true differential pressure sensor. In some cases, the two fluid environments may be located at a great distance one from another. In such cases, use of two remote absolute pressure sensors may provide a good solution for measuring a pressure differential.

Failure of a differential pressure sensor can be problematic in some applications. If, for example, one of the two bridges of a differential sensor has a sensor failure, then the differential pressure sensor is rendered incapable of measurement of differential pressure. Failure to measure a differential pressure can cause a system to perform poorly or to cease performance altogether. Suboptimal performance can waste money and/or present a danger to people. For some such systems where these deleterious consequences can arise, improved sensor reliability can provide increased safety and/or prevent wasted expenses.

SUMMARY

Apparatus and associated methods relate to a system for providing redundant measurement of pseudo differential pressure. The system includes a first absolute-pressure sensor exposed to a first environment. The first absolute-pressure sensor includes a plurality of pressure transducers configured in a first Wheatstone bridge. The first Wheatstone bridge has first and second output nodes that operationally generate output signals that increase and decrease, respectively, in response to increasing pressure of the first environment. The system includes a second absolute-pressure sensor exposed to a second environment. The second absolute-pressure sensor includes a plurality of pressure transducers configured in a second Wheatstone bridge. The second Wheatstone bridge has third and fourth output nodes that operationally generate output signals that increase and decrease, respectively, in response to increasing pressure of the second environment. The system includes a first difference calculator electrically coupled to the first and third output nodes of the first and second absolute-pressure sensors, respectively. The first difference calculator generates, based on a difference between the output signals of the first and third output nodes, a first measurement signal indicative of a pressure difference between the first and second environments. The system includes a second difference calculator electrically coupled to the second and fourth output nodes of the first and second absolute-pressure sensors, respectively. The second difference calculator generates, based on a difference between the output signals of the second and fourth output nodes, a second measurement signal indicative of the pressure difference between the first and second environments.

Some embodiments relate to a system for providing redundant measurements of pseudo differential pressure. The system includes first and second absolute-pressure sensors configured to measure a pressure of first and second environments, respectively. Each of the first and second absolute-pressure sensors includes an elastically deformable membrane configured to deform in response to exposure to an environment having a pressure. Each of the first and second absolute-pressure sensors includes a first piezoresistor located on a first surface region of the elastically deformable membrane. The first surface region becomes increasingly convex in response to increasing pressure. Each of the first and second absolute-pressure sensors a second piezoresistor located on a second surface region of the elastically deformable membrane. The second surface region becomes increasingly concave in response to increasing pressure. The first piezoresistors of both the first and second absolute-pressure sensors are electrically configured in a first Wheatstone bridge operatively generating a first measurement signal indicative of a pressure difference between the first and second environments. The second piezoresistors of both the first and second absolute-pressure sensors are electrically configured in a second Wheatstone bridge operatively generating a second measurement signal indicative of the pressure difference between the first and second environments.

Some embodiments relate to a method for providing redundant measurements of pseudo differential pressure. The method includes exposing a first absolute pressure sensor to the first environment having the first pressure. The method includes exposing a second absolute pressure sensor to the second environment having the second pressure. The method includes generating first and second output signals, each indicative of the first pressure of the first environment. The method includes generating third and fourth output signals, each indicative of the second pressure of the second environment. The method includes calculating a first difference signal between the first and third output signals. The method includes calculating a second difference signal between the second and fourth output signals. The method includes selecting a measurement signal from among the first and second difference signals for use as a signal indicative of a pressure difference between the first and second environments. The method also includes outputting the selected measurement signal.

DETAILED DESCRIPTION

Apparatus and associated methods relate to generating redundant measurement of pseudo differential pressure using two absolute-pressure sensors, each exposed to a different environment. Each of the two absolute-pressure sensors has complementary first and second output nodes. The first output node has a positive relation with and/or response to increasing pressure, while the second output node has a negative relation with and/or response to increasing pressure. A first difference measurement signal is calculated based on a difference between the positive relation output signals of the first and second absolute-pressure sensors. A second difference measurement signal is calculated based on a difference between the negative relation output signals of the first and second absolute-pressure sensors. Both the first and second difference measurement signals are indicative of a pressure difference between the first and second environments. Such redundant measurement of differential pressure can advantageously provide continuous pressure-difference measurement in spite of various component failures.

Figure 1:
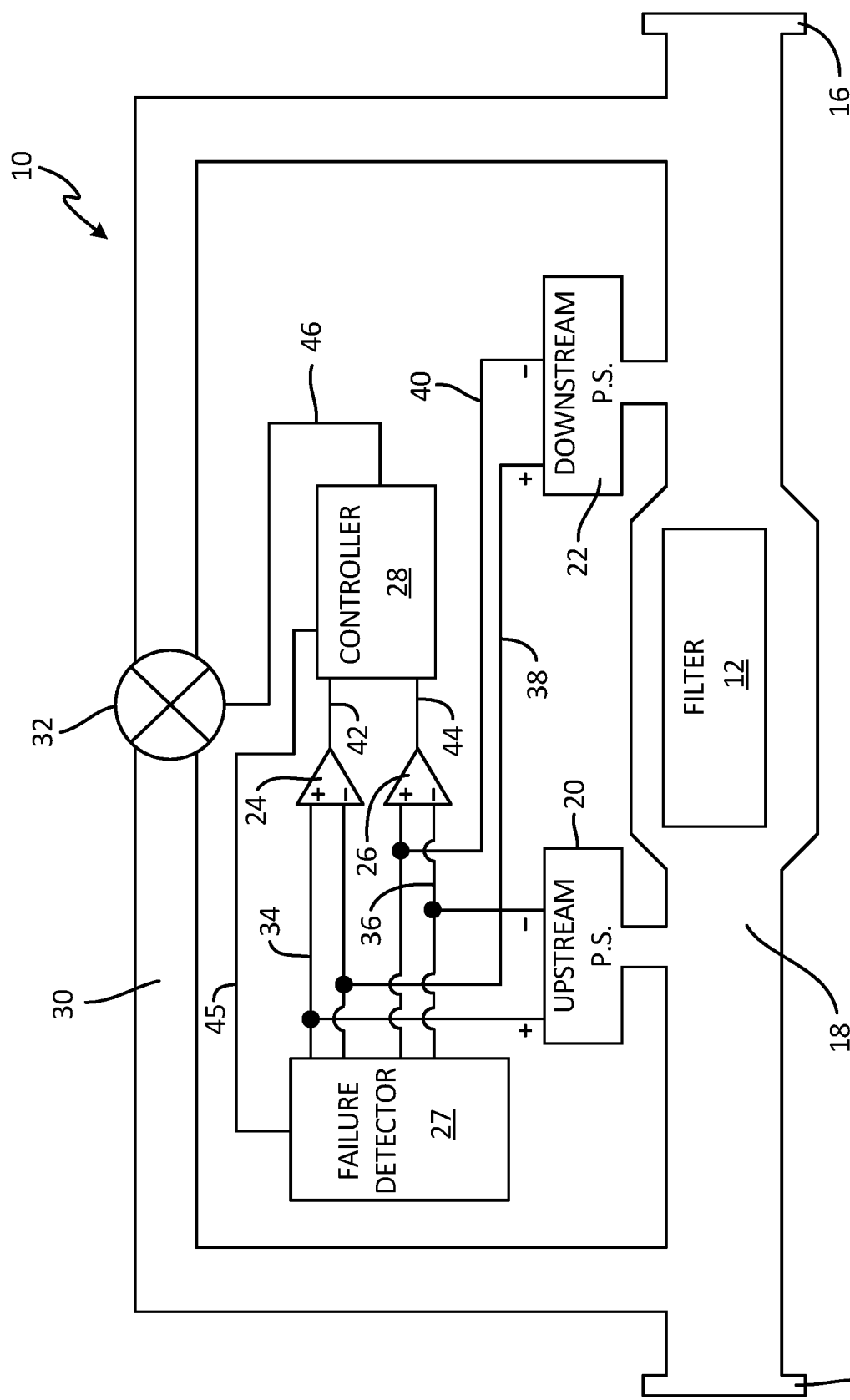
FIG. 1 is a schematic diagram of a fluid filter system providing redundant measures of pseudo differential pressure using absolute-pressure sensors on either side of a fluid filter.

FIG. 1 is a schematic diagram of a fluid filter system providing redundant measures of pseudo differential pressure using absolute-pressure sensors on either side of a fluid filter. In FIG. 1, system 10 is configured to monitor a pressure difference across fluid filter 12 to determine if fluid filter 12 is permitting fluid conduction therethrough. System 10 includes input port 14, output port 16, fluid conductor 18, fluid filter 12, upstream pressure sensor 20, downstream pressure sensor 22, difference calculators 24 and 26, sensor failure detector 27, controller 28, bypass fluid conductor 30, and bypass valve 32. Fluid filter 12 is located between input port 14 and output port 16 within fluid conductor 18. As fluid filter 12 removes contaminants within a fluid flowing within fluid conductor 18, fluid filter 12 can become less conductive of fluid flow. If fluid filter 12 becomes so contaminated that the fluid conductivity between input port 14 and output port 16 falls below a specified threshold, a process that uses system 10 can fall out of specification. When the conductivity falls below the specified threshold, controller 28 can temporarily open bypass valve 32 so as to permit the fluid to flow through bypass fluid conductor 30 bypassing fluid conductor 18 until fluid filter 12 can be replaced.

Controller 28 can be configured to open bypass valve 32 based on a pseudo-differential pressure measurement across filter 12. Controller 28 can also be configured to generate an alert so as to notify a user that fluid filter 12 is in need of replacement. Fluid conductor 18 is equipped with upstream pressure sensor 20 and downstream pressure sensor 22. Upstream pressure sensor 20 senses an absolute pressure of the conducted fluid at a location upstream of fluid filter 12, while downstream pressure sensor 22 senses an absolute pressure of the conducted fluid at a location downstream of fluid filter 12. Each of pressure sensors 20 and 22 provides a positive relation signal and a negative relation signal. Both the positive relation signals and the negative relation signals are indicative of an absolute pressure as measured by pressure sensors 20 and 22. The positive relation signals increase with and/or in response to increasing absolute pressure, and the negative relation signals decrease with and/or in response to increasing absolute pressure. Upstream pressure sensor 20 provides its positive relation signal on node 34 and its negative relation signal on node 36. Downstream pressure sensor 22 provides its positive relation signal on node 38 and its negative relation signal on node 40.

First difference calculator 24 receives the positive relation signals of both upstream pressure sensor 20 and downstream pressure sensor 22. First difference calculator 24 calculates a difference between the positive relation signal provided by upstream pressure sensor 20 on node 34 and the positive relation signal provided by downstream pressure sensor 22 on node 38. The calculated difference between the positive relation signals of pressure sensors 20 and 22 is indicative of a differential pressure across fluid filter 12. First difference calculator 24 provides, based on the calculated difference, a first difference signal that is indicative of the differential pressure across filter 12, on node 42.

Second difference calculator 26 receives the negative relation signals of both upstream pressure sensor 20 and downstream pressure sensor 22. Second difference calculator 26 calculates a difference between the negative relation signal provided by upstream pressure sensor 20 on node 36 and the negative relation signal provided by downstream pressure sensor 22 on node 40. The calculated difference between the negative relation signals of pressure sensors 20 and 22 is indicative of a differential pressure across fluid filter 12. Second difference calculator 26 provides, based on the calculated difference, a second difference signal that is indicative of the differential pressure across filter 12, on node 44.

Sensor failure detector 27 also receives sensor signals on nodes 34, 36, 38 and 40. Sensor failure detector 27 compares each of the signals received on nodes 34, 36, 38 and 40 with one or more predetermined thresholds. If one or more of the signals received on nodes 34, 36, 38 and 40 are determined by sensor failure detector 27 to have failed, based on the comparison, then sensor failure detector 27 will generate a failure signal indicative of the node or nodes 34, 36, 38 or 40 on which the sensor signal is indicative of a failure. Sensor failure detector 27 provides the generated failure signal on node 45.

Controller 28 receives both first difference signal on node 42 and second difference signal on node 44. Controller 28 also receives failure signal on node 45. If controller 28 determines, based on the received failure signal, that both the first and second difference signals are operating properly, then controller 28 can use one or both of the first and second difference signals to determine whether to open and/or close bypass valve 32. For example, if no failures pertaining to either the first or second difference signals are indicated by the failure signal, then controller 28 can average the first and second difference signals, for example. Controller 28 can then compare the average of the first and second difference signals with a predetermined threshold. If, for example, the averaged first and second difference signals exceed the predetermined threshold, indicating that the pressure difference across filter 12 is greater than a predetermined value, then controller 28 can generate a control signal on node 46 configured to open bypass valve 32 to augment the fluid conductivity of fluid conductor 18 with bypass fluid conductor 30.

If controller 28 determines, based on the failure signal, that one of positive and/or negative relation signals on nodes 34, 36, 38 and 40 are indicative of a failure, controller 28 can select an operative one of first and second difference signals on nodes 42 and 44 to determine whether to open and/or close bypass valve 32. For example, if a failure signal received on node 45 is indicative of a failure of a sensor providing signals affecting the first difference signal on node 42, then controller 28 can use the second difference signal on node 44 to determine whether to open and/or close bypass valve 32. Similarly, if a failure signal received on node 45, for example, is indicative of a failure of a sensor providing signals affecting the second difference signal on node 44, then controller 28 can use the first difference signal on node 42 to determine whether to open and/or close bypass valve 32. If a failure signal indicates that both the first difference signal on node 42 and the second difference signal on node 44 are compromised, then controller 28 can generate an alarm signal.

Figure 2:
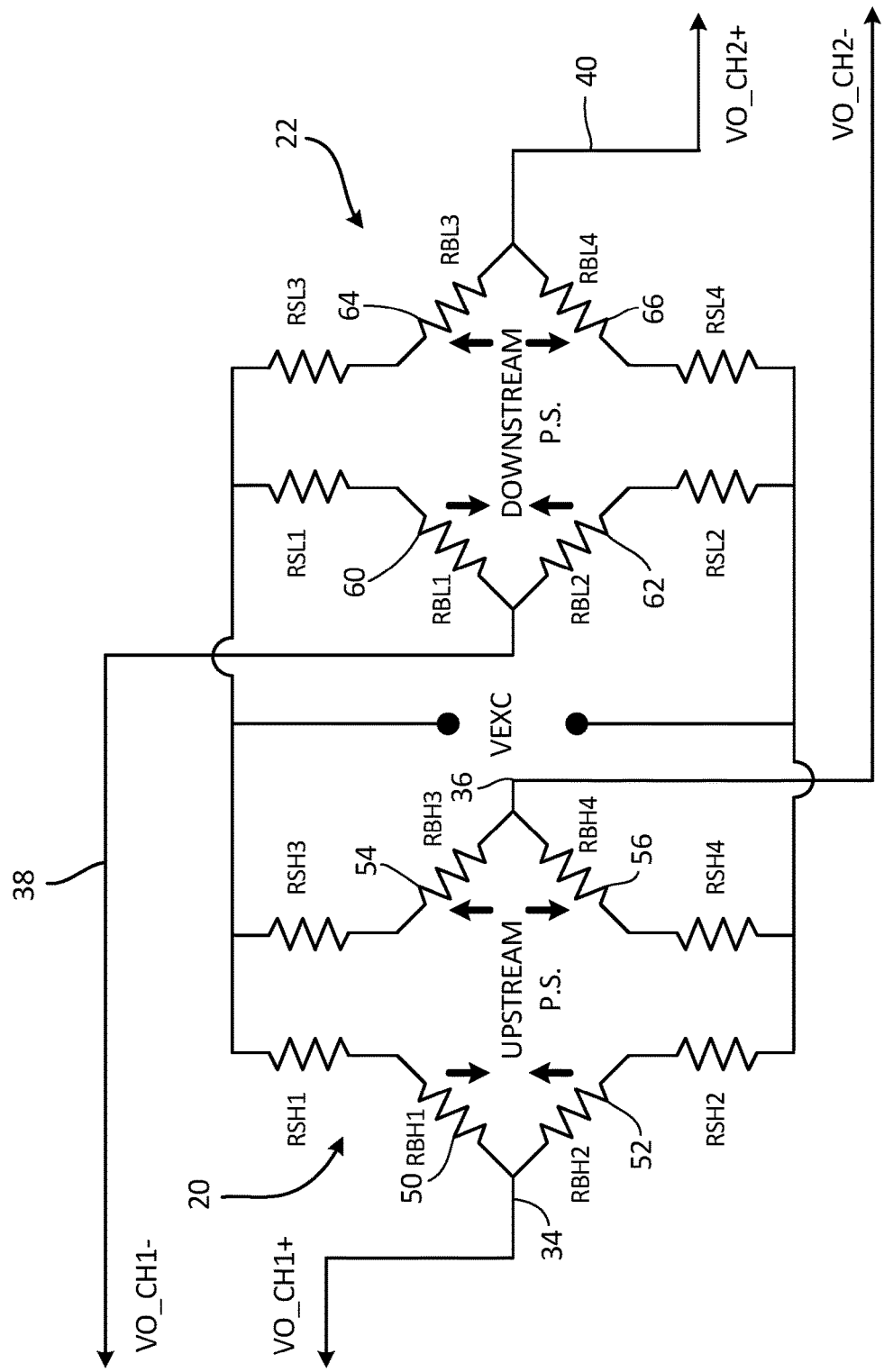
FIG. 2 is an electrical schematic of two absolute pressure sensors configured to provide redundant measures of pseudo differential pressure.

FIG. 2 is an electrical schematic of two absolute pressure sensors configured to provide redundant measures of pseudo differential pressure. In FIG. 2, absolute pressure sensors 20 and 22 are shown schematically. Each of absolute pressure sensors 20 and 22 is configured as a Wheatstone bridge. Absolute pressure sensor 20 has four pressure transducers 50, 52, 54 and 56. Pressure transducers 50 and 56 are negative relation transducers (as indicated by the downward facing arrows), which decrease in resistance in response to increasing pressure. Pressure transducers 52 and 54 are positive relation transducers (as indicated by the upward facing arrows) which increase in resistance in response to increasing pressure. Pressure transducers 50, 52, 54 and 56 are configured as a Wheatstone bridge which provides for differential output signals on nodes 34 and 36.

Absolute pressure sensor 22 also has four pressure transducers 60, 62, 64 and 66. Pressure transducers 60 and 66 are negative relation transducers (as indicated by the downward facing arrows), which decrease in resistance in response to increasing pressure. Pressure transducers 62 and 64 are positive relation transducers (as indicated by the upward facing arrows) which increase in resistance in response to increasing pressure. Pressure transducers 60, 62, 64 and 66 are configured as a Wheatstone bridge which provides for differential output signals on nodes 38 and 40.

Two absolute pressure sensors can be configured to provide redundant pseudo-differential measurements if they provide a differential output signal. Thus, each of the two absolute pressure sensors does not require four pressure transducers as is depicted in FIG. 2. For example, in some embodiments, absolute pressure sensor 20 can have only positive relation pressure transducers 52 and 54. Instead of negative relation transducers 50 and 56, resistors can be used in their respective locations within the Wheatstone bridge. In some embodiments, only negative relation transducers 50 and 56 may be used, with resistors replacing positive relation transducers 52 and 54. In another exemplary embodiment, positive relation transducer 52 and negative relation transducer 56 may be used, with resistors replacing positive relation transducer 54 and negative relation transducer 50, for example. In all of the above embodiments, differential signals are produced on nodes 34 and 36, each indicative of a measurement of absolute pressure, one having a positive relation and one having a negative relation with the absolute pressure.

In some embodiments, absolute pressure sensors can be manufactured using piezoresistive materials. Such piezoresistive materials have a resistivity that changes in response to mechanical strain. The piezoresistive material can be formed in various ways. For example, some piezoresistive materials are deposited as thin films on a wafer or substrate. Some piezoresistive materials are formed by diffusing dopant species into a wafer or substrate. Some micro pressure sensors use an elastically deformable membrane as a member that is mechanically responsive to pressure changes.

The elastically deformable membrane can be located above a reference cavity in which a reference pressure can be maintained. The membrane can then deform in response to an externally applied pressure that is different from the reference pressure. Such a pressure differential can elastically deform the membrane. In some embodiments, a substrate or backing wafer may support the cavity and membrane to provide strength and/or to reduce a packaging stress. In some applications, the backing wafer can have a pressure through-hole aligning to the cavity. When a pressure through-hole is so provided, the reference pressure of the reference cavity can be provided by a fluid environment external to the cavity.

Piezoresistors can be formed on various surface regions of the elastically deformable membrane. Some of these surface regions can produce tensile strain in the piezoresistors located thereon. Some of these surface regions can produce compressive strain in the piezoresistors located thereon. By locating piezoresistors on both tensile strain producing surface regions and compressive strain producing surface regions, some piezoresistors have resistances that increase and some piezoresistors have resistances that decrease in response to elastic deformation. This measure of elastic deformation, in turn, can correspond to a difference between the externally applied pressure and the reference pressure of the reference cavity.

Pseudo differential pressure sensing can be accomplished using two of these absolute pressure sensors. Each absolute pressure sensor can be exposed to a different one of two environments or two locations between which a measurement of differential pressure is sought. A difference between each of the two measurements of the two environments or two locations can then be made by comparing a difference between the resistance changes of the piezoresistors of the two absolute pressure sensors. Each of the absolute pressure sensors can have two or more piezoresistors, at least one located on a tensile strain producing surface region and at least one located on a compressive strain producing surface region. This configuration results in one of the piezoresistors having a resistance that increases in response to an increasing externally applied pressure and one of the piezoresistors having a resistance that decreases in response to an increasing externally applied pressure.

The piezoresistors of the two absolute pressure sensors can be connected as a Wheatstone bridge. Judiciously ordering the connection of the piezoresistors of the two absolute pressure sensors in the Wheatstone bridge can be done so as to facilitate redundancy and robustness. Such a judicious ordering of piezoresistors can permit a pseudo differential pressure sensor to provide a signal indicative of a differential pressure even in the event that one or more of the individual transducers should fail. To accomplish such redundancy, each leg of the Wheatstone bridge includes a piezoresistor from each of the two absolute pressure sensors. Thus, even if one of the legs should fail, the non-failing leg provides a signal indicative of a differential pressure.

Figure 3A:
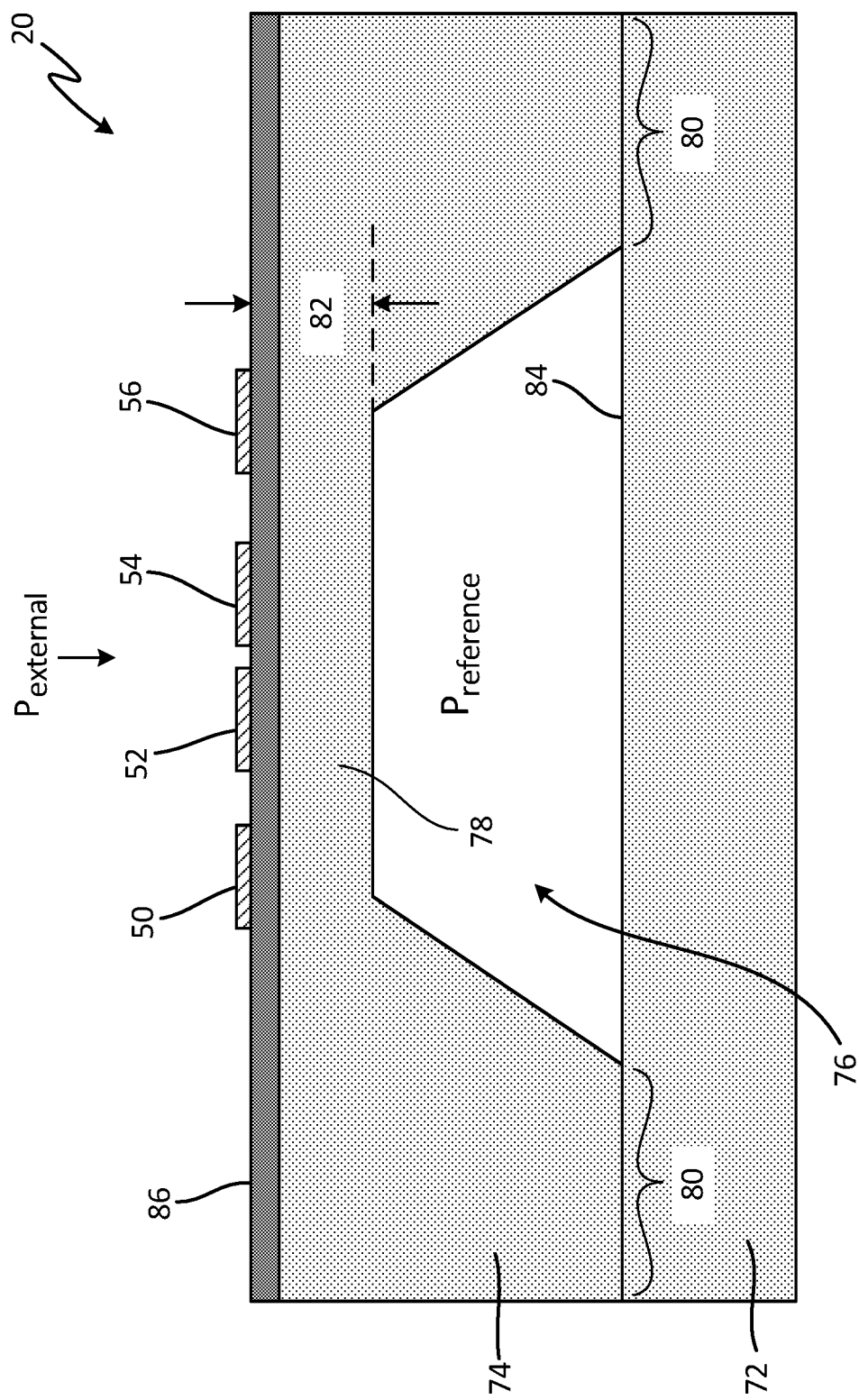
FIGS. 3A and 3B are side elevation views of an exemplary MEMS absolute pressure sensor, without and with a positive external pressure, respectively.
Figure 3B:
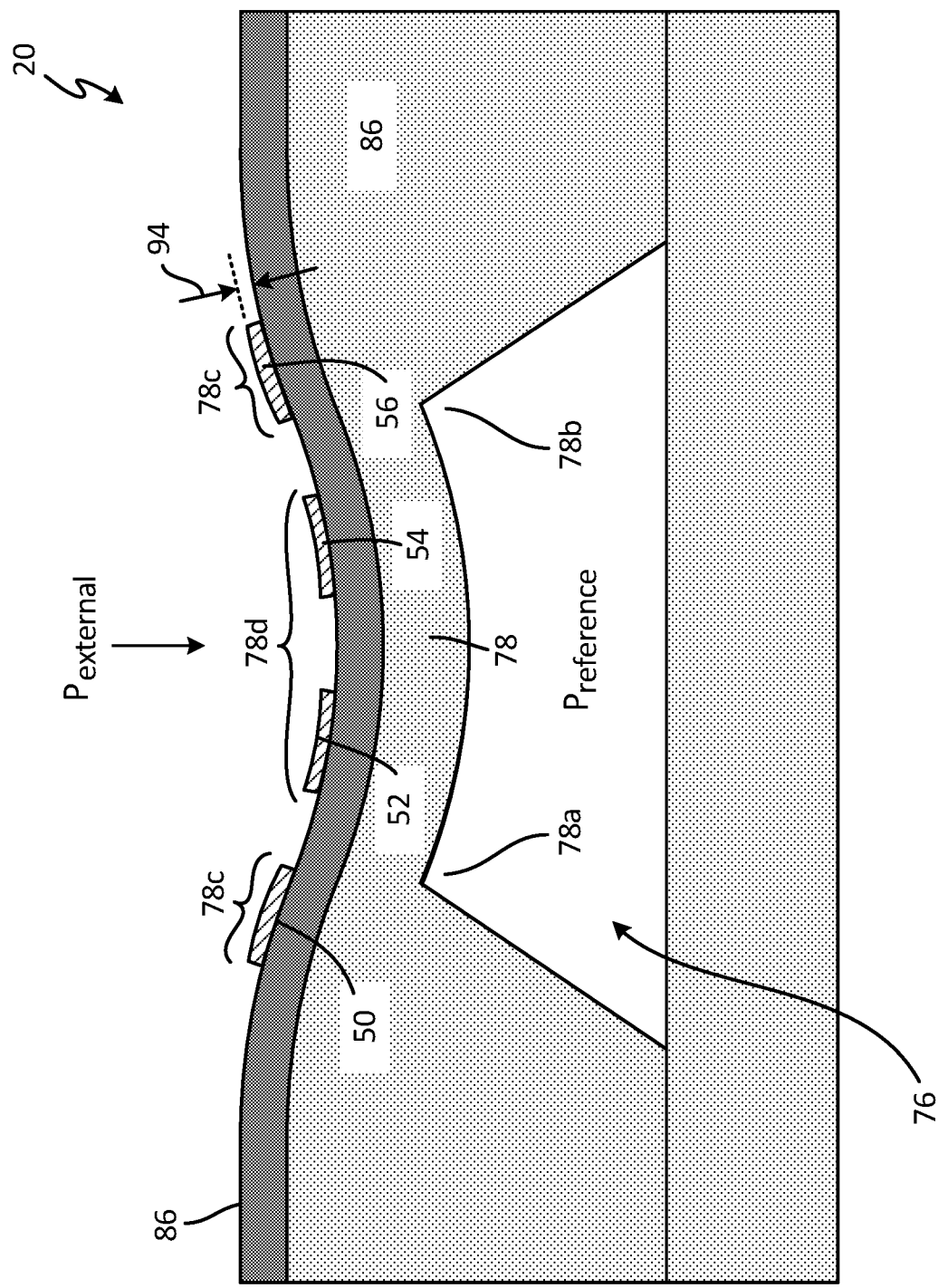

FIGS. 3A, 3B are side elevation views of an exemplary absolute pressure sensor, without and with a positive external pressure, respectively. In FIG. 3A, absolute pressure sensor 20 is shown cross-sectioned so as to reveal an inner reference cavity. Absolute pressure sensor 20 includes backing wafer 72, substrate 74, and piezoresistors 50, 52, 54 and 56. Reference cavity 76 has been formed in substrate 74, creating elastically deformable membrane 78 supported by adjacent support structures 80. Elastically deformable membrane 78 has a thickness 82 so as to permit a difference between an external pressure $P_{external}$ and a reference pressure $P_{reference}$ that exists within reference cavity 76 to cause elastically deformable membrane 78 to deflect toward cavity floor 84. In some embodiments a deflection limiter can provide a mechanical stop to limit the amount of deflection of elastically deformable membrane 78.

Each of piezoresistors 50, 52, 54 and 56 is intimately connected to top surface 86 of elastically deformable membrane 80. Because piezoresistors 50, 52, 54 and 56 are intimately connected to top surface 86 of elastically deformable membrane 78, piezoresistors 50, 52, 54 and 56 will deform commensurate with a deformation of the regions of top surface 86 to which piezoresistors 50, 52, 54 and 56 adhere. Thus, when elastically deformable membrane 20 deforms, so do piezoresistors 50, 52, 54 and 56. When piezoresistors 50, 52, 54 and 56 deform (e.g., undergo compressive and/or tensile strain), resistances of piezoresistors 50, 52, 54 and 56 change in response to deformation of piezoresistors 50, 52, 54 and 56.

Piezoresistors 50, 52, 54 and 56 are located on top surface 86 of elastically deformable membrane 78 in order to deform in response to deformations of elastically deformable membrane 78. Top surface 86 can have a layer of a dielectric material such as, for example, silicon dioxide and/or silicon nitride. Piezoresistors 50 and 56 are located on regions of top surface 86 where piezoresistors 50 and 56 will experience tensile strain in response to external pressure $P_{external}$ exceeding reference pressure $P_{reference}$. Piezoresistors 52 and 54 are located on regions of top surface 90 where piezoresistors 52 and 54 will experience compressive strain in response to external pressure $P_{external}$ exceeding reference pressure $P_{reference}$.

FIG. 3B depicts absolute pressure sensor 20 shown in FIG. 3A, but in a deformed state in response to external pressure $P_{external}$ exceeding reference pressure $P_{reference}$ of reference cavity 76. Such a difference in pressures has caused elastically deformable membrane 78 to deform and deflect toward cavity floor 84 of reference cavity 76. In the depicted state, each of ends 78a, 78b of deformable membrane 78 traces an S-shape, having convex portions 78c and concave portions 78d. Convex portions 78c and concave portions 78d are so described from the perspective of looking down upon top surface 86 of absolute pressure sensor 20.

When elastically deformable membrane 78 is deformed as depicted in FIG. 3B, an intimate interface between piezoresistors 50, 52, 54 and 56 and elastically deformable membrane 78 causes bottom portions of piezoresistors that are proximate these intimate interfaces to deform in a similar fashion as the deformation of elastically deformable membrane 78. Such convex and concave deformations are then projected throughout thickness 82 of piezoresistors 50, 52, 54 and 56, respectively. The projections of convex portions 78c cause top portions of piezoresistors 50 and 56 to be in tensile stress. The projections of concave portions 78d cause top portions of piezoresistors 52 and 54 to be in compressive stress.

Piezoresistors 50 and 56 that are in tensile stress have resistances that change with a first polarity. Piezoresistors 52 and 54 that are in compressive stress have resistances that change with a second polarity, opposite that of the first polarity. For example, in some embodiments, resistance along lengths of piezoresistors 50 and 56 may increase when piezoresistors 50 and 56 are in tensile stress, and resistance along the lengths of piezoresistors 52 and 54 may decrease when piezoresistors 52 and 54 are in compressive stress. In some embodiments, piezoresistors 50 and 56 may be series connected so as to increase signal strength of a first polarity signal. Similarly piezoresistors 52 and 54 may be series connected to increase signal strength of a second polarity signal.

Various piezoresistive materials may have various piezoresistive coefficients relating strain to signal magnitude and signal polarity. Some materials may increase in resistance under tensile strain and decrease in resistance under compressive strain. Other materials my increase in resistance under compressive strain and decrease in resistance under tensile strain. Henceforth the polarity of the piezoresistive coefficient will be indicated by an arrow drawn across a resistor. Piezoresistors having resistances that increase in response to increasing pressure will be represented by an up-arrow. Piezoresistors having resistances that decrease in response to increasing pressure will be represented by a down-arrow. The arrows annotating piezoresistor symbols that are pointed in the same direction to one another indicate piezoresistors that have the same polarity of resistance change in response to changes in external pressure $P_{external}$.

Figure 4:
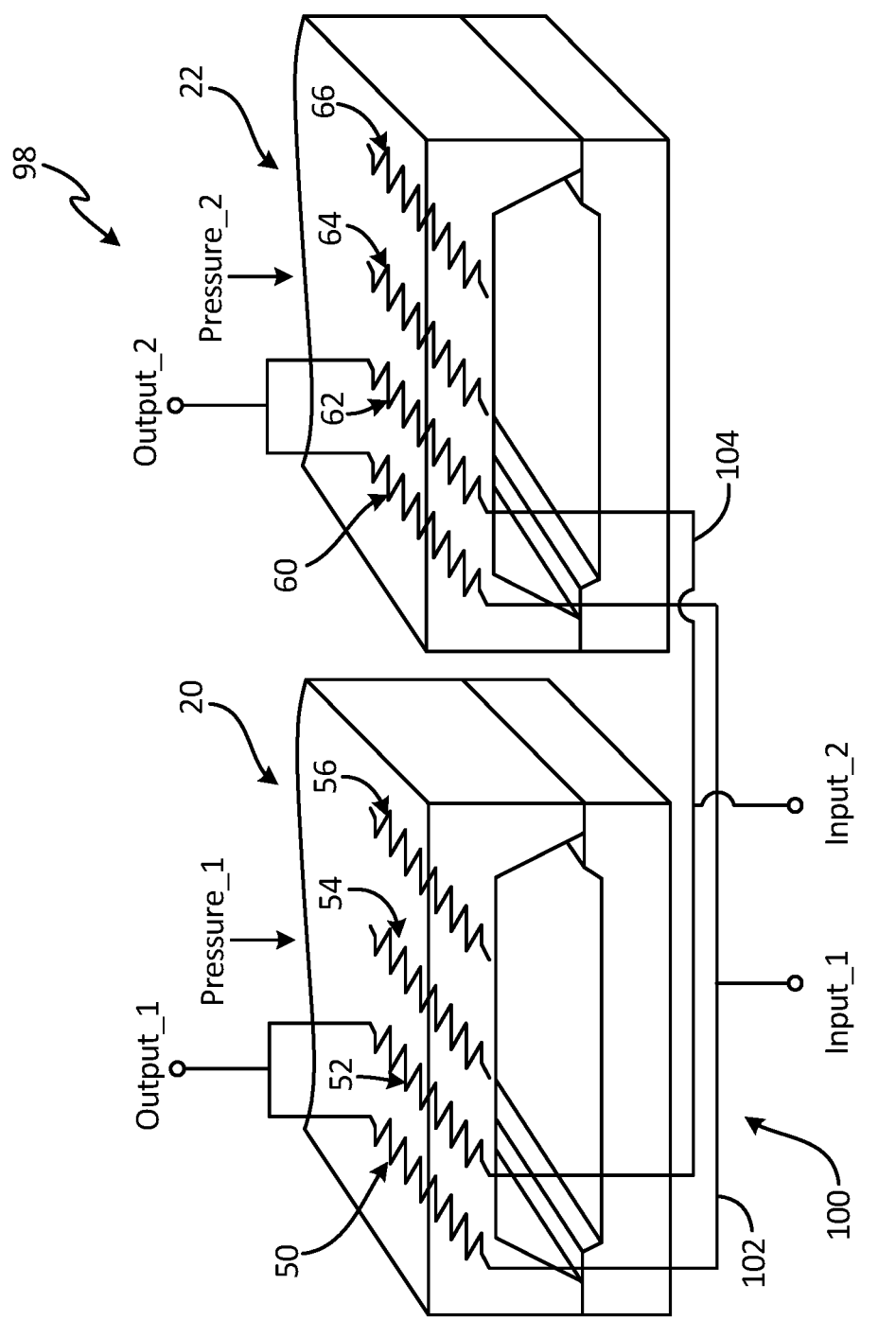
FIG. 4 is a perspective view of an exemplary pseudo differential pressure sensor configured as a Wheatstone bridge.

FIG. 4 is a perspective view of an exemplary pseudo differential pressure sensor configured as a Wheatstone bridge. In FIG. 4, pseudo differential pressure sensor 98 includes first absolute pressure sensor 20 and second absolute pressure sensor 22. First absolute pressure sensor 20 includes piezoresistors 50, 52, 54 and 56. Similarly, second absolute pressure sensor 22 includes piezoresistors 60, 62, 64 and 66.

Piezoresistors 50 and 52 of absolute pressure sensor 20 and piezoresistors 60 and 62 of absolute pressure sensor 22 are electrically connected as Wheatstone bridge 100. Wheatstone bridge 100 includes first voltage-divider leg 102 and second voltage-divider leg 104. First voltage-divider leg 102 includes piezoresistors 50 and 52 of first absolute pressure sensor 20 series connected at first output node OUTPUT_1 (or Vo CH1+). Second voltage-divider leg 104 includes piezoresistor 60 and 62 of second absolute pressure sensor 22 series connected at second output node OUTPUT_2 (or Vo CH1−). Each of the piezoresistors sharing a voltage-divider leg 102 or 104 has the same relation (e.g., relation to absolute pressure) of signal with respect to the absolute pressure to which it responds, albeit each voltage-divider leg pertains to a different absolute pressure sensor 20 and 22, respectively. The arrangement of the opposite polarities of resistance change in the two voltage divider legs 102 and 104, however, is different, one from the other. Such a configuration of polarities of transducers within voltage divider legs ensures that OUTPUT_1 will have the same relation to absolute pressure as OUTPUT_2 has to absolute pressure. In this way, a difference between the signals produced at OUTPUT_1 and OUTPUT_2 will represent a pseudo-differential pressure between Presssure_1 and Pressure_2.

Piezoresistors 54, 56, 64 and 66 can be electrically connected in a fashion that is similar to the electrical connection of piezoresistors 50, 52, 60 and 62. Such a connection can provide a redundant measure of pseudo-differential pressure. In some embodiments, piezoresistors 54, 56, 64 and 66 can be electrically connected as a second Wheatstone bridge for such redundancy.

The following are non-exclusive descriptions of possible embodiments of the present invention.

An exemplary embodiment relates to a system for providing redundant measurement of pseudo differential pressure. The system includes a first absolute-pressure sensor exposed to a first environment. The first absolute-pressure sensor includes a plurality of pressure transducers configured in a first Wheatstone bridge. The first Wheatstone bridge has first and second output nodes that operationally generate first and second output signals that increase and decrease, respectively, in response to increasing pressure of the first environment. The system includes a second absolute-pressure sensor exposed to a second environment. The second absolute-pressure sensor includes a plurality of pressure transducers configured in a second Wheatstone bridge. The second Wheatstone bridge has third and fourth output nodes that operationally generate first and second output signals that increase and decrease, respectively, in response to increasing pressure of the second environment. The system includes a first difference calculator electrically coupled to the first and third output nodes of the first and second absolute-pressure sensors, respectively. The first difference calculator generates, based on a difference between the first and third output signals of the first and third output nodes, a first measurement signal indicative of a pressure difference between the first and second environments. The system also includes a second difference calculator electrically coupled to the second and fourth output nodes of the first and second absolute-pressure sensors, respectively. The second difference calculator generates, based on a difference between the second and fourth output signals of the second and fourth output nodes, a second measurement signal indicative of the pressure difference between the first and second environments.

The system of the preceding paragraph can optionally include, additionally and/or alternatively, any one or more of the following features, configurations and/or additional components:

A further embodiment of the foregoing system, wherein each of the plurality of pressure transducers of the first absolute pressure sensor can be a piezo-resistive transducer, and each of the plurality of pressure transducers of the second absolute pressure sensor can be a piezo-resistive transducer.

A further embodiment of any of the foregoing systems, wherein each of the first and second absolute-pressure sensors can include an elastically deformable membrane configured to deform in response to exposure to an environment having a pressure. Each of the first and second absolute-pressure sensors can further include a first piezoresistor located on the elastically deformable membrane at a first region where increasing the pressure of the environment produces an increasing tensile strain in the first piezoresistor. Each of the first and second absolute-pressure sensors can further include a second piezoresistor located on the elastically deformable membrane at a second region where increasing the pressure of the environment produces an increasing compressive strain in the second piezoresistor.

A further embodiment of any of the foregoing systems, wherein each of the first and second absolute-pressure sensors can further include a third piezoresistor located on the elastically deformable membrane at a third region where increasing the pressure of the environment produces an increasing tensile strain in the third piezoresistor. Each of the first and second absolute-pressure sensors can further include a fourth piezoresistor located on the elastically deformable membrane at a fourth region where increasing the pressure of the environment produces an increasing compressive strain in the fourth piezoresistor.

A further embodiment of any of the foregoing systems, wherein the first and second piezoresistors of each of the first and second absolute-pressure sensors can be electrically connected as a first voltage-divider leg of the first and second Wheatstone bridges. The third and fourth piezoresistors of each of the first and second absolute-pressure sensors can be electrically connected as a second voltage-divider leg of the first and second Wheatstone bridges.

A further embodiment of any of the foregoing systems can further include a control system configured to supply operating power to the first and second absolute-pressure sensors, and to receive, from the first and second difference calculators, the first and second measurement signals, respectively.

A further embodiment of any of the foregoing systems, wherein the control system can be further configured to evaluate whether each of the first and second measurement signals are within a predetermined signal range corresponding to a normal operating range.

A further embodiment of any of the foregoing systems, wherein, upon determining that only one of the first and the second measurement signals is within the predetermined signal range, the control system can generate a measurement signal indicative of the pressure difference between the first and second environments based on one of the first and second output signals that is within the predetermined signal range.

A further embodiment of any of the foregoing systems can further include a flow tube having a filter element separating a first end and a second end. The first absolute-pressure sensor can be in fluid communication with the first end of the flow tube. The second absolute-pressure sensor can be in fluid communication with the second side of the flow tube.

Some embodiments relate to a system for providing redundant measurement of pseudo differential pressure. The system includes first and second absolute-pressure sensors configured to measure a pressure of first and second environments, respectively. Each of the first and second absolute-pressure sensors includes an elastically deformable membrane configured to deform in response to exposure to an environment having a pressure. Each of the first and second absolute-pressure sensors includes a first piezoresistor located on a first surface region of the elastically deformable membrane. The first surface region becoming increasingly convex in response to increasing pressure. Each of the first and second absolute-pressure sensors includes a second piezoresistor located on a second surface region of the elastically deformable membrane. The second surface region becomes increasingly concave in response to increasing pressure. The first piezoresistors of both the first and second absolute-pressure sensors are electrically configured in a first Wheatstone bridge operatively generating a first measurement signal indicative of a pressure difference between the first and second environments. The second piezoresistors of both the first and second absolute-pressure sensors are electrically configured in a second Wheatstone bridge operatively generating a second measurement signal indicative of the pressure difference between the first and second environments.

The system of the preceding paragraph can optionally include, additionally and/or alternatively, any one or more of the following features, configurations and/or additional components:

A further embodiment of the foregoing system, wherein each of the first and second absolute-pressure sensors can further include a third piezoresistor located on a third surface region of the elastically deformable membrane. The first surface region can become increasingly convex in response to increasing pressure. Each of the first and second absolute-pressure sensors can further include a fourth piezoresistor located on a fourth surface region of the elastically deformable membrane. The second surface region becoming increasingly concave in response to increasing pressure.

A further embodiment of any of the foregoing systems, wherein the first and fourth piezoresistors of each of the first and second absolute-pressure sensors can form a first voltage divider, and the second and third piezoresistors of each the first and second absolute-pressure sensors can form a second voltage divider. The first Wheatstone bridge can include the first voltage dividers of the first and second absolute-pressure sensors and the second Wheatstone bridge can include the second voltage dividers of each of the first and second absolute-pressure sensors.

A further embodiment of any of the foregoing systems can further include a control system configured to supply operating power to the first and second absolute-pressure sensors, and to receive, from the first and second Wheatstone bridges, the first and second measurement signals, respectively.

A further embodiment of any of the foregoing systems, wherein the control system can be further configured to evaluate whether each of the first and second measurement signals are within a predetermined signal range corresponding to a normal operating range.

A further embodiment of any of the foregoing systems, wherein, upon determining that only one of the first and the second measurement signals is within the predetermined signal range, the control system can generate a measurement signal indicative of the pressure difference between the first and second environments based on one of the first and second output signals that is within the predetermined signal range.

A further embodiment of any of the foregoing systems can further include a flow tube having a filter element separating a first end and a second end. The first absolute-pressure sensor can be in fluid communication with the first end of the flow tube. The second absolute-pressure sensor can be in fluid communication with the second side of the flow tube.

Some embodiments relate to a method for providing redundant measurement of pseudo differential pressure. The method includes exposing a first absolute pressure sensor to the first environment having a first pressure. The method includes exposing a second absolute pressure sensor to the second environment having a second pressure. The method includes generating complementary first and second output signals, each indicative of the first pressure of the first environment. The method includes generating complementary third and fourth output signals, each indicative of the second pressure of the second environment. The method includes calculating a first difference signal between the first and third output signals. The method includes calculating a second difference signal between the second and fourth output signals. The method includes selecting a measurement signal from among the first and second difference signals for use as a signal indicative of a pressure difference between the first and second environments. The method also includes outputting the selected measurement signal.

The method of the preceding paragraph can optionally include, additionally and/or alternatively, any one or more of the following features, configurations and/or additional components:

A further embodiment of the foregoing method, wherein selecting from among the first and second difference signals can include comparing each of the first and second difference signals with each of a high reference signal and a low reference signal. Selecting from among the first and second difference signals can further include selecting one of the first and second difference signals that is between the high reference signal and the low reference signal.

A further embodiment of any of the foregoing methods, wherein selecting from among the first and second difference signals can further include selecting, if only one of the first and the second difference signals is between the high and the low reference signals, the one of the first and the second difference signals that is between the high and the low reference signals.

A further embodiment of any of the foregoing methods can further include generating, in response to neither the first nor the second difference signal being between the high and the low reference signals, an alarm signal.

While the invention has been described with reference to an exemplary embodiment(s), it will be understood by those skilled in art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for providing redundant measurement of pseudo differential pressure, the system comprising:
   a first absolute-pressure sensor exposed to a first environment, the first absolute-pressure sensor including a plurality of pressure transducers configured in a first Wheatstone bridge, the first Wheatstone bridge having first and second output nodes that operationally generate first and second output signals that increase and decrease, respectively, in response to increasing pressure of the first environment;
   a second absolute-pressure sensor exposed to a second environment, the second absolute-pressure sensor including a plurality of pressure transducers configured in a second Wheatstone bridge, the second Wheatstone bridge having third and fourth output nodes that operationally generate first and second output signals that increase and decrease, respectively, in response to increasing pressure of the second environment;
   a first difference calculator electrically coupled to the first and third output nodes of the first and second absolute-pressure sensors, respectively, the first difference calculator generating, based on a difference between the first and third output signals of the first and third output nodes, a first measurement signal indicative of a pressure difference between the first and second environments; and
   a second difference calculator electrically coupled to the second and fourth output nodes of the first and second absolute-pressure sensors, respectively, the second difference calculator generating, based on a difference between the second and fourth output signals of the second and fourth output nodes, a second measurement signal indicative of the pressure difference between the first and second environments.

2. The system of claim 1, wherein each of the plurality of pressure transducers of the first absolute pressure sensor is a piezo-resistive transducer, and each of the plurality of pressure transducers of the second absolute pressure sensor is a piezo-resistive transducer.

3. The system of claim 1, wherein each of the first and second absolute-pressure sensors comprises:

an elastically deformable membrane configured to deform in response to exposure to an environment having a pressure;
a first piezoresistor located on the elastically deformable membrane at a first region where increasing the pressure of the environment produces an increasing tensile strain in the first piezoresistor; and
a second piezoresistor located on the elastically deformable membrane at a second region where increasing the pressure of the environment produces an increasing compressive strain in the second piezoresistor.

4. The system of claim 3, wherein each of the first and second absolute-pressure sensors further comprises:
a third piezoresistor located on the elastically deformable membrane at a third region where increasing the pressure of the environment produces an increasing tensile strain in the third piezoresistor; and
a fourth piezoresistor located on the elastically deformable membrane at a fourth region where increasing the pressure of the environment produces an increasing compressive strain in the fourth piezoresistor.

5. The system of claim 4, wherein the first and second piezoresistors of each of the first and second absolute-pressure sensors are electrically connected as a first voltage-divider leg of the first and second Wheatstone bridges, wherein the third and fourth piezoresistors of each of the first and second absolute-pressure sensors are electrically connected as a second voltage-divider leg of the first and second Wheatstone bridges.

6. The system of claim 1, further comprising a control system configured to supply operating power to the first and second absolute-pressure sensors, and to receive, from the first and second difference calculators, the first and second measurement signals, respectively.

7. The system of claim 6, wherein the control system is further configured to evaluate whether each of the first and second measurement signals are within a predetermined signal range corresponding to a normal operating range.

8. The system of claim 7, wherein, upon determining that only one of the first and the second measurement signals is within the predetermined signal range, the control system generates a measurement signal indicative of the pressure difference between the first and second environments based on one of the first and second output signals that is within the predetermined signal range.

9. The system of claim 1, further comprising a flow tube having a filter element separating a first end and a second end, the first absolute-pressure sensor in fluid communication with the first end of the flow tube, the second absolute-pressure sensor in fluid communication with the second side of the flow tube.

10. A system for providing redundant measurements of pseudo differential pressure, the system comprising:
first and second absolute-pressure sensors configured to measure a pressure of first and second environments, respectively, each of the first and second absolute-pressure sensors comprising:
an elastically deformable membrane configured to deform in response to exposure to an environment having a pressure;
a first piezoresistor located on a first surface region of the elastically deformable membrane, the first surface region becoming increasingly convex in response to increasing pressure;
a second piezoresistor located on a second surface region of the elastically deformable membrane, the second surface region becoming increasingly concave in response to increasing pressure;
a third piezoresistor located on a third surface region of the elastically deformable membrane, the first surface region becoming increasingly convex in response to increasing pressure; and
a fourth piezoresistor located on a fourth surface region of the elastically deformable membrane, the second surface region becoming increasingly concave in response to increasing pressure,
wherein the first piezoresistors of both the first and second absolute-pressure sensors are electrically configured in a first Wheatstone bridge operatively generating a first measurement signal indicative of a pressure difference between the first and second environments,
wherein the second piezoresistors of both the first and second absolute-pressure sensors are electrically configured in a second Wheatstone bridge operatively generating a second measurement signal indicative of the pressure difference between the first and second environments.

11. The system of claim 10, wherein the first and fourth piezoresistors of each of the first and second absolute-pressure sensors form a first voltage divider, and the second and third piezoresistors of each the first and second absolute-pressure sensors form a second voltage divider, the first Wheatstone bridge including the first voltage dividers of the first and second absolute-pressure sensors and the second Wheatstone bridge including the second voltage dividers of each of the first and second absolute-pressure sensors.

12. The system of claim 10, further comprising a control system configured to supply operating power to the first and second absolute-pressure sensors, and to receive, from the first and second Wheatstone bridges, the first and second measurement signals, respectively.

13. The system of claim 12, wherein the control system is further configured to evaluate whether each of the first and second measurement signals are within a predetermined signal range corresponding to a normal operating range.

14. The system of claim 13, wherein, upon determining that only one of the first and the second measurement signals is within the predetermined signal range, the control system generates a measurement signal indicative of the pressure difference between the first and second environments based on one of the first and second output signals that is within the predetermined signal range.

15. The system of claim 10, further comprising a flow tube having a filter element separating a first end and a second end, the first absolute-pressure sensor in fluid communication with the first end of the flow tube, the second d absolute-pressure sensor in fluid communication with the second side of the flow tube.

16. A method for providing redundant measurements of pseudo differential pressure, the method comprising:
exposing a first absolute pressure sensor to the first environment having a first pressure;
exposing a second absolute pressure sensor to the second environment having a second pressure;
generating complementary first and second output signals, each indicative of the first pressure of the first environment;
generating complementary third and fourth output signals, each indicative of the second pressure of the second environment;
calculating a first difference signal between the first and third output signals;

calculating a second difference signal between the second and fourth output signals;

selecting a measurement signal from among the first and second difference signals for use as a signal indicative of a pressure difference between the first and second environments; and outputting the selected measurement signal.

17. The method of claim 16, wherein selecting from among the first and second difference signals comprises:

comparing each of the first and second difference signals with each of a high reference signal and a low reference signal; and selecting one of the first and second difference signals that is between the high reference signal and the low reference signal.

18. The method of claim 17, wherein selecting from among the first and second difference signals further comprises:

selecting, if only one of the first and the second difference signals is between the high and the low reference signals, the one of the first and the second difference signals that is between the high and the low reference signals.

19. The method of claim 17, further comprising:

generating, in response to neither the first nor the second difference signal being between the high and the low reference signals, an alarm signal.

* * * * *